(12) United States Patent
Smith

(10) Patent No.: US 10,938,856 B2
(45) Date of Patent: Mar. 2, 2021

(54) SYSTEMS AND METHODS FOR SECURITY PROTOCOL EXECUTION IN A HIERARCHICAL STATE MACHINE-DRIVEN EXECUTION PLAN

(71) Applicant: Intel Corporation, Santa Clara, CA (US)

(72) Inventor: Ned Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 15/941,206

(22) Filed: Mar. 30, 2018

(65) Prior Publication Data
US 2019/0044976 A1 Feb. 7, 2019

(51) Int. Cl.
| | | |
|---|---|---|
| *H04L 9/00* | (2006.01) | |
| *H04L 29/06* | (2006.01) | |
| *H04L 29/08* | (2006.01) | |
| *G06F 16/27* | (2019.01) | |
| *H04L 9/32* | (2006.01) | |
| *H04L 9/08* | (2006.01) | |

(52) U.S. Cl.
CPC .............. *H04L 63/20* (2013.01); *G06F 16/27* (2019.01); *H04L 9/0897* (2013.01); *H04L 9/3239* (2013.01); *H04L 63/06* (2013.01); *H04L 63/061* (2013.01); *H04L 63/10* (2013.01); *H04L 63/101* (2013.01); *H04L 63/102* (2013.01); *H04L 67/04* (2013.01); *H04L 67/10* (2013.01); *H04L 67/12* (2013.01); *H04L 67/22* (2013.01); *H04L 67/2809* (2013.01); *H04L 67/32* (2013.01); *H04L 67/42* (2013.01); *H04L 2209/38* (2013.01)

(58) Field of Classification Search
CPC ....... H04L 63/20; H04L 63/061; H04L 63/06; H04L 63/10; H04L 67/04; H04L 67/10; H04L 67/12; H04L 67/22
See application file for complete search history.

(56) References Cited

U.S. PATENT DOCUMENTS 6,324,496 B1 * 11/2001 Alur ................... G06F 11/3608
703/17
6,408,262 B1 * 6/2002 Leerberg ............. G06F 11/3608
703/2

(Continued)

OTHER PUBLICATIONS

"Ioflo Flow Based Programming Framework," retrieved from the internet https://github.com/ioflo, on Aug. 9, 2018, 3 pages.

*Primary Examiner* — Beemnet W Dada
(74) *Attorney, Agent, or Firm* — Hanley, Flight and Zimmerman, LLC

(57) ABSTRACT

Methods, apparatus, systems and articles of manufacture are disclosed to facilitate information exchange using publish-subscribe with blockchain. An example apparatus includes a security manager to integrate a security service with an instruction execution flow in a distributed device environment. The security manager is to include a processor. The processor is to be configured to implement at least an executable hierarchical state machine to provide credential management and access management in conjunction with instruction execution according to an execution plan. The executable hierarchical state machine is to generate a security context for the execution plan to implement a guard condition governing a transition from a first state to a second state in accordance with the execution plan.

27 Claims, 13 Drawing Sheets

(56) References Cited

U.S. PATENT DOCUMENTS

2005/0262099 A1* 11/2005 Manfredi .............. H04L 63/168
2008/0046817 A1* 2/2008 Sharp ....................... G06F 8/38
                                                            715/700
2011/0078556 A1* 3/2011 Prasad .................... G06F 9/451
                                                            715/234
2019/0044976 A1* 2/2019 Smith .................... H04L 63/10

* cited by examiner

SYSTEMS AND METHODS FOR SECURITY PROTOCOL EXECUTION IN A HIERARCHICAL STATE MACHINE-DRIVEN EXECUTION PLAN

FIELD OF THE DISCLOSURE

This disclosure relates generally to execution of security protocols, and, more particularly, to systems and methods for security protocol execution in a hierarchical state machine-driven execution plan.

BACKGROUND

The Internet of Things (IoT) is a network of devices that include electronics, software, sensors, and network connectivity to gather and exchange data. IoT-enabled devices communicate via a protocol, such as Simple Object Access Protocol (SOAP) service, Web Services Description Language (WDSL) service, Representational State Transfer (REST or RESTful) service, etc. For example, RESTful IoT frameworks, such as an Open Connectivity Framework (OCF), etc., rely on a messaging protocol such as CRUDN (Create, Retrieve, Update, Delete, and Notify) messaging protocol to communicate among IoT devices. Using a messaging protocol, execution of a sequence of instructions can be orchestrated (e.g., referred to as an execution plan). However, CRUDN and other messaging protocols do not support safe and autonomous IoT execution planning. Therefore, security protocols implemented using traditional IoT infrastructure can be considered unsafe.

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the OCF.

DETAILED DESCRIPTION

Figure 1:
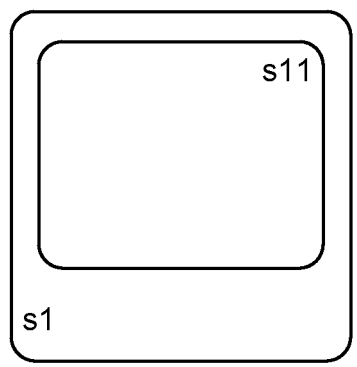
FIG. 1 shows an example of nested states for a hierarchical state machine.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

IoT-enabled devices communicate via a protocol, such as SOAP, WDSL, REST (also referred to as RESTful), etc. For example, RESTful IoT frameworks, such as OCF, etc., rely on a messaging protocol such as CRUDN messaging protocol to communicate among IoT devices. Using a messaging protocol, an execution plan can be orchestrated. However, traditional messaging protocols, such as CRUDN, etc., do not support safe and autonomous IoT execution planning. Therefore, security protocols implemented using prior, traditional IoT infrastructure can be considered unsafe.

Industrial IoT protocols, such as Data Distribution Service (DDS), etc., support PUBLISH and SUBSCRIBE primitives (e.g., programming language items or code segments) that work over brokered and broker-less IoT models (also referred to as distributed pub-sub or distributed publish-subscribe). However, publish-subscribe infrastructure traditionally does not address safe and autonomous execution. Prior attempts at security protocols implemented using IoT infrastructure are unsafe.

One problem with prior approaches is directional end-to-end security. A secure path for registration is uni-directional because credentials used by a subscriber to subscribe differ from credentials used by a publisher to publish (to the subscriber). Thus, even though a publish-subscribe model involves both publisher and subscriber entities, the semantics of publish access differ from the semantics of subscribe.

Additionally, asynchronous publication implies that subscriber(s) may never communicate directly with the publisher. Instead, message traffic may be intermediated by one or more brokers or intermediaries. In distributed publish-subscribe, notifications may be broadcast or routed to all participating endpoints only to be filtered based on a profile to identify only topics of interest to a particular subscriber. Pre-requisite security flows may also rely on a publish-subscribe notification system, but filters may ignore presence of security or capability pre-requisites, which can result in denial-of-service or reuse of otherwise stale security context information by a subscribing device.

Further, a security context used to authenticate the subscriber to the publisher (or broker) can expire between a time of subscriber registration and subsequent publication(s). Expiration of the security context results in an inability for the publisher (or broker) to securely deliver content.

A further complication exists when a publisher attempts to deliver a message to subscriber(s) at which access policies have not been updated to allow message delivery. Thus, a message can be lost, refused, and/or otherwise incomplete due to outdated or expired access/security policy.

Additionally, multiple publications may be associated with a same topic. The same topic may imply that a same security context (e.g., credentials and access policies, etc.) should apply at an appropriate level of granularity to the multiple publications. However, this may not be true in all configurations, and mistaken assumptions can result in incomplete and/or otherwise improper execution of an execution plan.

Taken on their own, existing solutions such as OCF, DDS, etc., overlook directional security semantics. That is, access rules intended to control subscription registration are inappropriate to govern publication interactions that follow registrations. Using, OCF, DDS, etc., a server is not provisioned with access control lists (ACLs), roles or credentials to support a role reversal of the server acting as a client to deliver a message to the client acting as a server. Additionally, security contexts and access policies can become stale and result in allowing access that increases potential for privilege escalation and/or denying access which results in unintended denial of service.

Virtual private networks (VPNs) are too general (e.g., having coarse granularity) and provide security at a device-to-device level rather than at a topic or message level. Further, VPNs are not end-to-end secure. For example, use of brokers creates an unintended need for 'trusted' brokers.

Security vulnerability assessments must currently overlook these gaps in coverage analysis, which leaves open a possibility for attack nodes to deliver or replay messages illicitly.

Certain examples address these problems, needs, and deficiencies in prior approaches by providing one or more executable hierarchical state machines (HSMs) with integrated security. In certain examples described herein, an HSM-based execution plan includes integrated security protocols providing guard conditions for entry to and exit from states in the HSM. Integration of a security protocol as an expression of an HSM with an existing HSM application generates an HSM execution plan which unambiguously describes security-related states in context with application states such that entry into and exit from both security and application states are performed in a correct order.

In certain examples, if context information, such as security context, becomes stale (e.g., outdated), an execution state can be rolled back to a prior "good" state (e.g., a prior secure state). Without rollback semantics, stale security contexts can be exploited by an attacker. With rollback semantics, stale security contexts are resolved and removed automatically because they exist between two states in a serialized state machine representation.

In a RESTful architecture, client-server interaction is driven using resource-based operations in which a device is represented as a resource and CRUDN operations are used to manipulate the resources. Thus, a request from a client to a server and a response from the server back to the client can be formed using one or more create, retrieve, update, delete, and/or notify messages.

In an example CRUDN-driven system, an endpoint is a source or destination of a request or response message for a given transport protocol suite. Each device is associated with at least one endpoint with which the device can exchange request and response messages. Data structures are used to describe resources and devices formed from the resources. Definitions describe mapping between devices in one or more systems (e.g., a plurality of RESTful systems, etc.). In certain examples, a request to a server is subject to an ACL policy check (e.g., subject-based access control, role-based access control, etc.) to verify permission for read and/or write access. With permission, operations such as get/observe, post, put, delete, etc., can be applied to resources.

Thus, using a CRUDN approach, an interaction model can be formed to enable a device, process, other resource, etc., to create a new resource on a server in the system. To retrieve, a current state or representation of a resource is gathered from a server. To update, a partial or complete update is requested for information stored in a resource. Delete removes a resource from the server. Notify requests asynchronous notification of state changes in a resource.

While RESTful systems are stateless systems, certain examples described herein improve RESTful system technology by applying a state machine to the RESTful architecture. In certain examples, the state machine is a hierarchical state machine (HSM). An example HSM ties responses to events as dependent on a nature of the event and a system context. In the state machine, nodes denote states and connectors between nodes denote transitions between nodes.

An example HSM can include hierarchically nested states. For example, as shown in FIG. 1, if a system is in a nested state s11 (also referred to as a substate), then the system is also in a surrounding state s1 (also referred to as a superstate). Events are handled according to the substate s11 as well as the superstate s1. In certain examples, substates only define difference(s) from the superstate. Thus, an event is first handled in the context of substate s11, and unhandled events are processed according to superstate s1, for example.

In a reactive system, a pattern is identified to process events in a particular way. In certain examples, an event-driven system associates requests and responses with events. Events are associated with states in the HSM.

Certain examples described herein integrate security policy management message flows with normal operational flows. In certain examples, security management flows become pre-requisite flows to normal operational flows. In certain examples, registration context dynamically provisions security credentials and access policies. If normal system is expressed as a hierarchical state machine, the security flows become guard conditions that apply to state entry and exit in the HSM.

In certain examples, access policy and credential provisioning can be more easily integrated and automated. In certain examples, a least privilege needed to accomplish the task can be applied. In certain examples, access policy enforcement and credential usage are timely (e.g., current), reducing the probability of security malfeasance. As an HSM, security flows are equally as safe as operational flows, which is an effective way to integrated and trade-off security and safety requirements.

Figure 2:
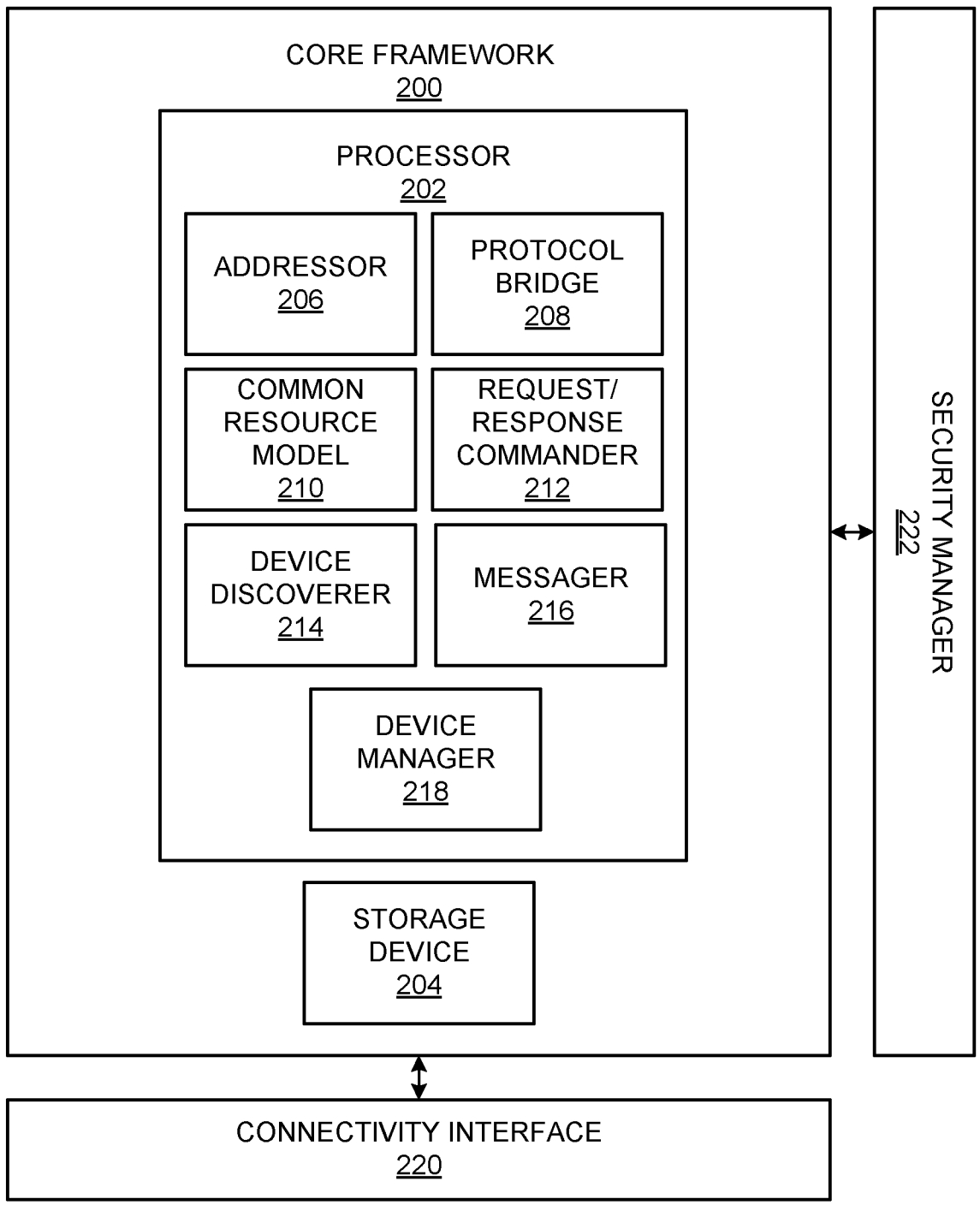
FIG. 2 illustrates a core framework providing processing and technological infrastructure to facilitate device communications in an Internet of Things device environment.

As shown in the example of FIG. 2, a core framework 200 provides processing and technological infrastructure to facilitate device communications including publish-subscribe exchanges, etc., in an IoT device environment. The example framework 200 includes a processor 202 and a storage device 204. The example processor 202 includes an addressor 206 that identifies and addresses entities communicating with the framework 200 including devices, clients, servers, resources, etc. A protocol bridge or gateway 208 includes a bridging specification which specifies a translation between devices such as a translation between protocols, etc. (e.g., AllJoyn to OCF, etc.). A common resource model 210 defines real world entities as data models representing resources. A request/response commander 212 facilitates requests and responses between resources using CRUDN commands (create, retrieve, update, delete, and notify), etc. A device discoverer 214 identifies devices in communication with the core framework 200. A messager 216 provides constrained device support for communication (e.g., Constrained Application Protocol (CoAP), HyperText Transfer Protocol (HTTP), etc.) as well as protocol translation via the protocol bridge 208, for example. A device manager 218 coordinates devices (e.g., clients, servers, other resources, other devices, etc.) in communication with the core framework 200. The storage device 204 can store instructions and data to facilitate operation exchange and communication between devices (e.g., IoT devices, etc.) via the framework 200.

A connectivity interface 220 provides a mechanism through which data communication, such as Layer 2 (L2) and/or Layer (L3) connectivity, networking, data transport, etc., is facilitated with the core framework 200. For example, data transport such as collection and distribution of information to one or more devices connected to the framework 200 is facilitated via the connectivity interface 220.

Figure 3:
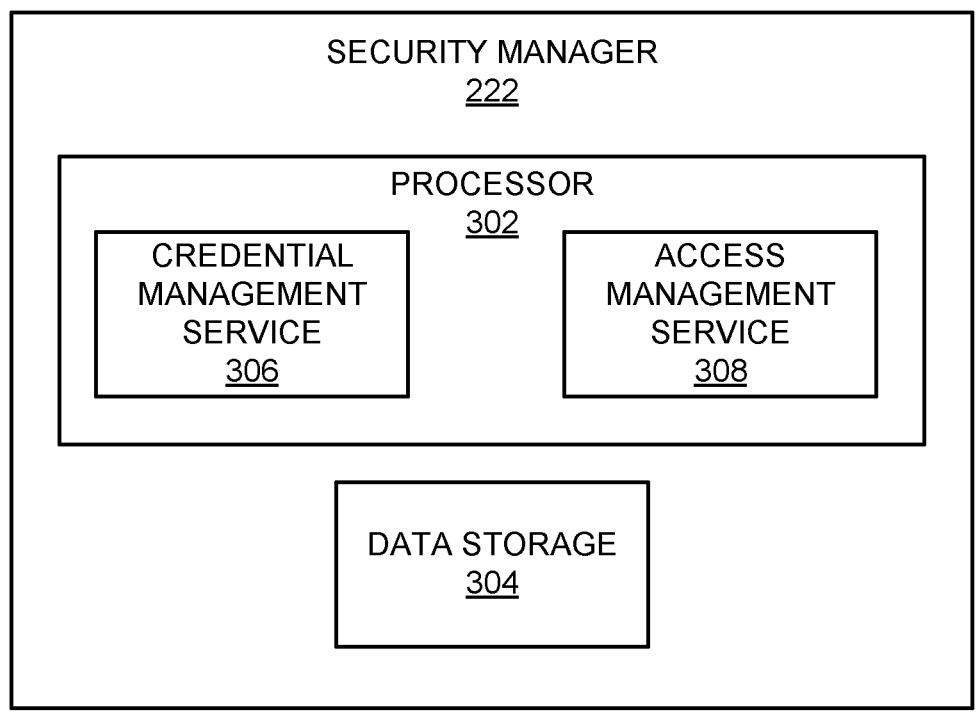
FIG. 3 illustrates an example implementation of the security manager of FIG. 2.

A security manager 222 includes a mechanism to apply one or more security protocols to communications coming into and going out from the core framework 200 including publish-subscribe communications between resources in an IoT system. As shown in the example of FIG. 3, the security manager 222 can be implemented to include a processor 302 and a data storage 304. The processor 302 can include a credential management service (CMS) 306 and an access management service (AMS) 308. The CMS 306 and AMS 308 work together to establish a security context within which to authenticate a resource and determine the resource's access to infrastructure, communication (e.g., pub-sub, etc.), other resource(s), etc. The security context can be provided to and/or otherwise be integrated with a state-based instruction execution flow via the request/response commander 212, messager 216, device manager 218, and/or other components of the framework 200 processor 202, for example.

The storage device 304 can store instructions and data to implement and execution security protocols to help ensure security, reliability, verifiability, etc., in instruction execution and communication between devices (e.g., IoT devices, etc.) via the framework 200.

The security manager 222 integrates security policy management message flows with normal operational flows through the framework 200 with respect to one or more connecting devices/resources, for example. In certain examples, security management flows become pre-requisite flows to normal operational flows. A registration context dynamically provisions security credentials and access policies. In certain examples, normal system operation is expressed as a hierarchical state machine (HSM), and associated security flows become guard conditions that apply to govern entry and exit from states defined in the HSM.

Using security flows as guard conditions in a HSM enables an access policy from the ASM 308 and credential provisioning by the CSM 306 to be more easily integrated and automated into the HSM management flow. Using guard conditions, a lowest level of privilege needed to accomplish a given task can be applied. Access policy enforcement by the ASM 308 and credential usage regulated by the CSM 306 are timely (current) reducing the probability of security malfeasance. In the HSM, security flows are implemented to be as safe as operational instruction and data flows, with integrated trade-offs based on security and safety requirements.

While an example implementation of the security manager 222 of FIG. 2 is illustrated in FIG. 3, one or more of the elements, processes and/or devices illustrated in FIG. 3 can be combined, divided, re-arranged, omitted, eliminated and/or implemented in any other way. Further, the example processor 302, the example data storage 304, the example credential management service 306, the example access management service 308, and/or, more generally, the example security manager 222 of FIG. 3 can be implemented by hardware, software, firmware and/or any combination of hardware, software and/or firmware. Thus, for example, any of the example processor 302, the example data storage 304, the example credential management service 306, the example access management service 308, and/or, more generally, the example security manager 222 of FIG. 3 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 302, the example data storage 304, the example credential management service 306, the example access management service 308, and/or, more generally, the example security manager 222 of FIG. 3 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example security manager 222 of FIG. 3 can include one or more elements, processes and/or devices in addition to, or instead of, those illustrated in FIG. 3, and/or may include more than one of any or all of the illustrated elements, processes and devices.

A security-enabled HSM can be applied to a publish-subscribe message flow to govern instruction execution, data access, and associated safeguards in an IoT execution plan, for example. In certain examples, a "registration" message (also referred to as a SUBSCRIBE) includes additional context that describes how to securely connect back to the registrant and/or intended recipient(s) (e.g., at the time asynchronous messages are ready to be sent). The registrant/subscriber supplies additional data such as: 1) a device identifier (ID) associated with the recipient(s); 2) a credential trust anchor(s) used by the recipient(s) to validate connection requests; and 3) an acknowledgement of the device ID a registrar/publisher is to use when attempting an asynchronous reply. Additionally, a registrant resource name that will be updated when sending the asynchronous reply and a resource interface name to be used when sending the asynchronous reply can be provided, along with a role the registrar is to possess when sending the asynchronous reply. The registrant can also provide an acknowledgement of the registrar's trusted ACL policy authoring service/provider. The registrant identifies the notification messages and/or bloom filters used to perform prerequisite security configuration. Defining the messaging system as an HSM allows identification of state machine guard conditions that are expected to bound available data access state(s), for example.

A registrar or publisher can perform additional duties including: 1) obtaining a credential that authenticates itself to the recipient(s); 2) obtaining a role authorization credential for a role involved in the data access; and 3) obtaining provisioning of an access control list entry granting the registrar UPDATE access to the registrant's designated resource. The registrar can open a connection to recipient(s) and supply credentials, permissions and access requirements to access data and/or other content, for example. The registrar can then update the designated response resource with an asynchronous response. Defining the system as an HSM allows the registrar to enforce state machine guard conditions, for example.

Figure 4:
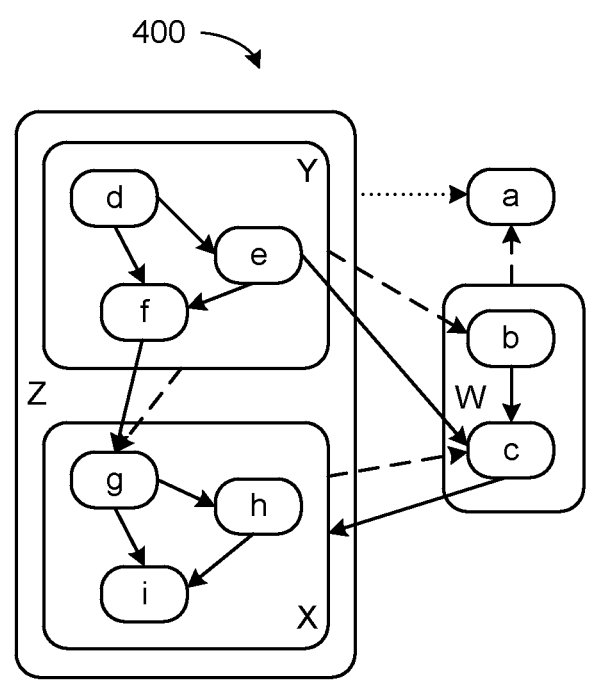
FIG. 4 depicts an example hierarchical state machine for an example system application.

Thus, using the core framework 200, one or more IoT system applications can be expressed as an HSM. FIG. 4 illustrates an example HSM 400 for an example IoT system application. Transitions to different state levels are reflected in the different styles (e.g., solid, dashed, dotted) of arrows used to depict changes in state in the diagram 400. In the example of FIG. 4, solid arrows indicate lower level transitions, dashed arrows indicate higher level transitions, and dotted arrows indicate highest level state transitions. When a lower level transition occurs, guard condition(s) associated with higher level states are also applied in addition to guard condition(s) for the lower level state(s). While arrows are shown indicating one direction in the example of FIG. 4, reverse transitions and application of guard conditions is also implied by the HSM diagram of FIG. 4.

For example, referred to the HSM 400, state Z is a superstate to state Y and X. While Y is a substate of state Z, Y is also a superstate to states d, e, and f. Similarly, while X is a substate of state Z, X is also a superstate of states g, h, and i. State W is a superstate to substates b and c, and state a is another state in the example HSM 400. In the example HSM 400, transitions among substates d, e, and f in superstate W are lower level transitions, subject to guard conditions of superstate W and its superstate Z, as well as guard conditions for substates d, e, and/or f. Similarly, transitions among substates g, h, and i are lower level transitions, subject to guard conditions of superstate X and its superstate Z, as well as guard conditions for substates g, h, and/or i, for example. A transition from superstate Y to substate g is a higher-level transition but is subject to guard conditions for highest level Z as well. Transitions between states b and c are subject to their associated guard conditions as well as guard conditions associated with their superstate W, for example. An illustrated transition between states e and c is subject to guard conditions associated with states e and c, as well as guard conditions associated with superstates W, Y, and Z. A transition between states Y and b is subject to guard conditions associated with states Y, b, W, and Z. A transition between states X and c is subject to guard conditions associated with states X, c, W, and Z. A transition between states W and a is subject to guard conditions associated with states W and a. A transition between states Z and a is subject to guard conditions associated with states Z and a, for example. Atomicity of states and associated transitions can be ensure using file and process locking mechanisms such as file locks, record locks, advisory locks, shared memory locks, spin locks, mutexes, etc.

Thus, FIG. 4 illustrates an example of safe execution planning according to the HSM 400. Mapping a plan for instruction execution into the HSM 400 and constructing the HSM 400 as one or more executable hierarchical state machines provides a technological innovation in distributed computing and associated executable environment(s).

Figure 5:
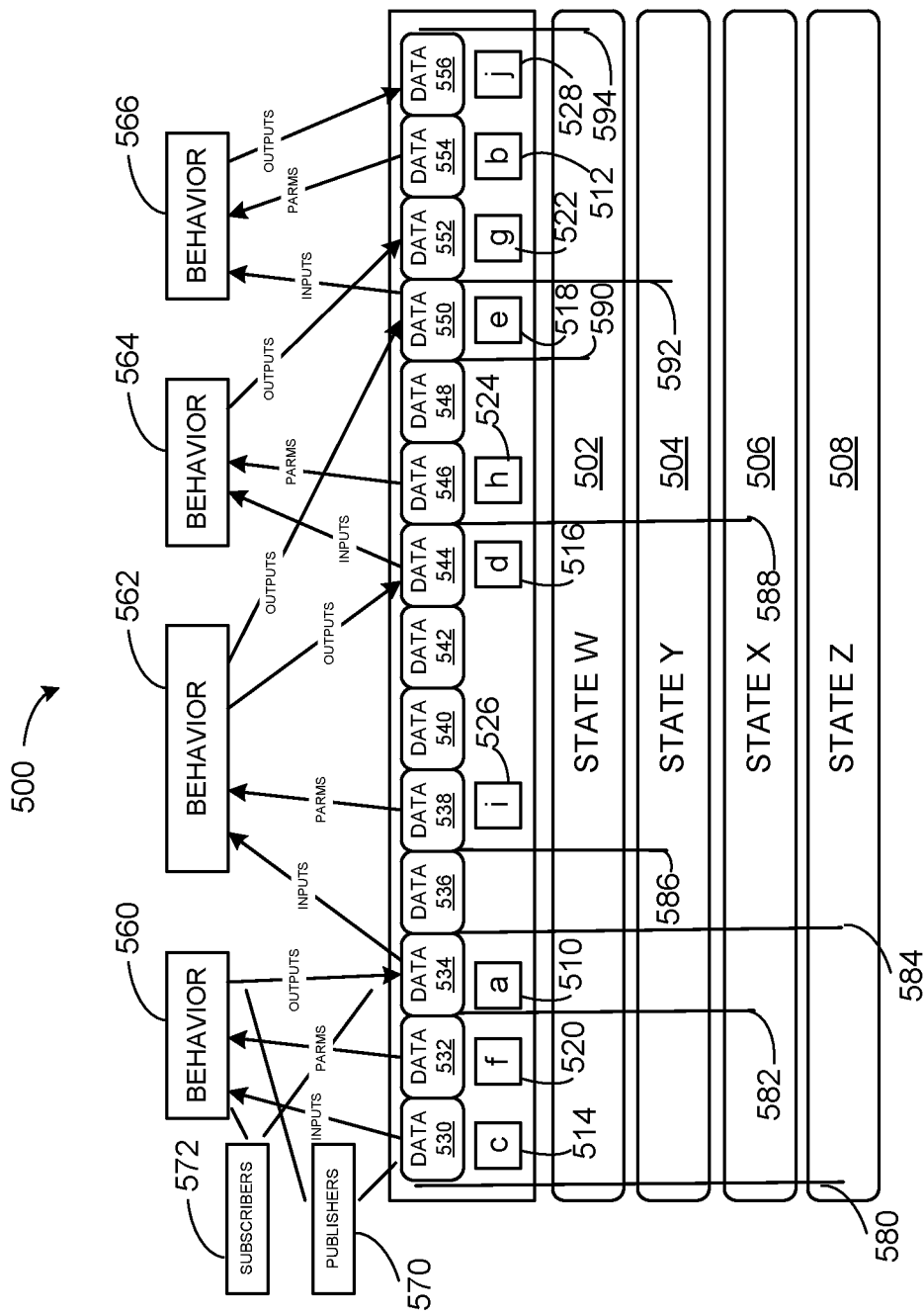
FIG. 5 illustrates an example execution plan defined by states and state transitions in a hierarchical state machine.

FIG. 5 shows states and state transitions from an HSM in the context of an IoT system execution plan 500. Thus, the example execution plan 500 shows integrated state transitions, and the specified integrated state transitions are considered 'safe' because data modification resulting from an output flow are atomic. That is, data modifications in the HSM execution plan 500 complete in a single step (are atomic). Guard conditions specified as part of the HSM state transitions are processed as a 'critical section' in which ordering is preserved according to sequencing specified in the HSM representation.

In certain examples, the HSM execution plan 500 can be implemented using a publish-subscribe model by classifying data objects as publishers and behavior blocks as both subscribers and publishers. Input, output, and parameter flows are provided as publish-subscribe "topics" that, therefore, can be implemented using an IoT pub-sub infrastructure such as Robot Operating System (ROS2), DDS, MQ Telemetry Transport (MQTT), Extensible Messaging and Presence Protocol (XMPP), etc.

The example HSM execution plan 500 of FIG. 5 takes states and maps the states into the execution plan 500 based on publishers and subscribers. The example plan 500 includes superstates W 502, Y 504, X 506, Z 508 and substates a 510, b 512, c 514, d 516, e 518, f 520, g 522, h 524, i 526, and j 528. States a-j 510-528 correspond to data items 530-556. The data items 530-556 relate to different behaviors 560-566.

For example, data item 530, corresponding to state c 514, provides input for the behavior 560. Data item 532, corresponding to state f 520, provides parameter(s) for the behavior 560. Data item 534, corresponding to state a 510, receives an output from the behavior 560 based on the input and parameter(s), for example. Publishers 570 drive the data items 530-556 and states 502-528 and gather output from one or more behaviors 560-566, and subscribers 572 receive updates and/or other messages regarding one or more behaviors 560-566 based on their subscription(s).

As shown in the example of FIG. 5, indicators or demarcaters 580-594 provide an indication of substates 510-528 included in each superstate 502-508. For example, indicators 580, 584 indicate that substates c 514, f 520, and a 510 are subsumed in superstate Z 508. Indicators 582 and 588 indicate that substates a 510, i 526, and d 516 are in superstate X 506. Indicators 586 and 592 show that substates i 526, d 516, h 524, and e 518 are part of superstate Y 504. Indicators 590, 594 show that substates e 518, g 522, and j 528 are subsumed by superstate W 502. Thus, superstates W-Z 502-508 are each combinations of publish-subscribe data flows forms by their constituent substates 510-528. Each pair of indicators 580-594 is associated with a behavior 560-566 (e.g., forming its input(s), parameter(s), and output(s), etc.).

For example, the state Z 508 includes states c 514, f 520, and a 510 as deterministic starting and ending points. In certain examples, deterministic start and end points are considered "safe" because they can be described in terms of data sets 530-556 and behaviors 560-566 that are described in terms of defined inputs and outputs represented by data items 530-556 representing states 510-528. Given the known, defined inputs and outputs, the security manager 218 can guarantee that program execution will terminate at a known point (e.g., start at state i 526 and go to state d 316 or state 518, etc.). The data items 530-556 are classified as publishers 570, and the behaviors 560-566 are classified as both publishers 570 and subscribers 572 to govern input, output, and parameter flows as publish-subscribe "topics", for example.

Figure 6:
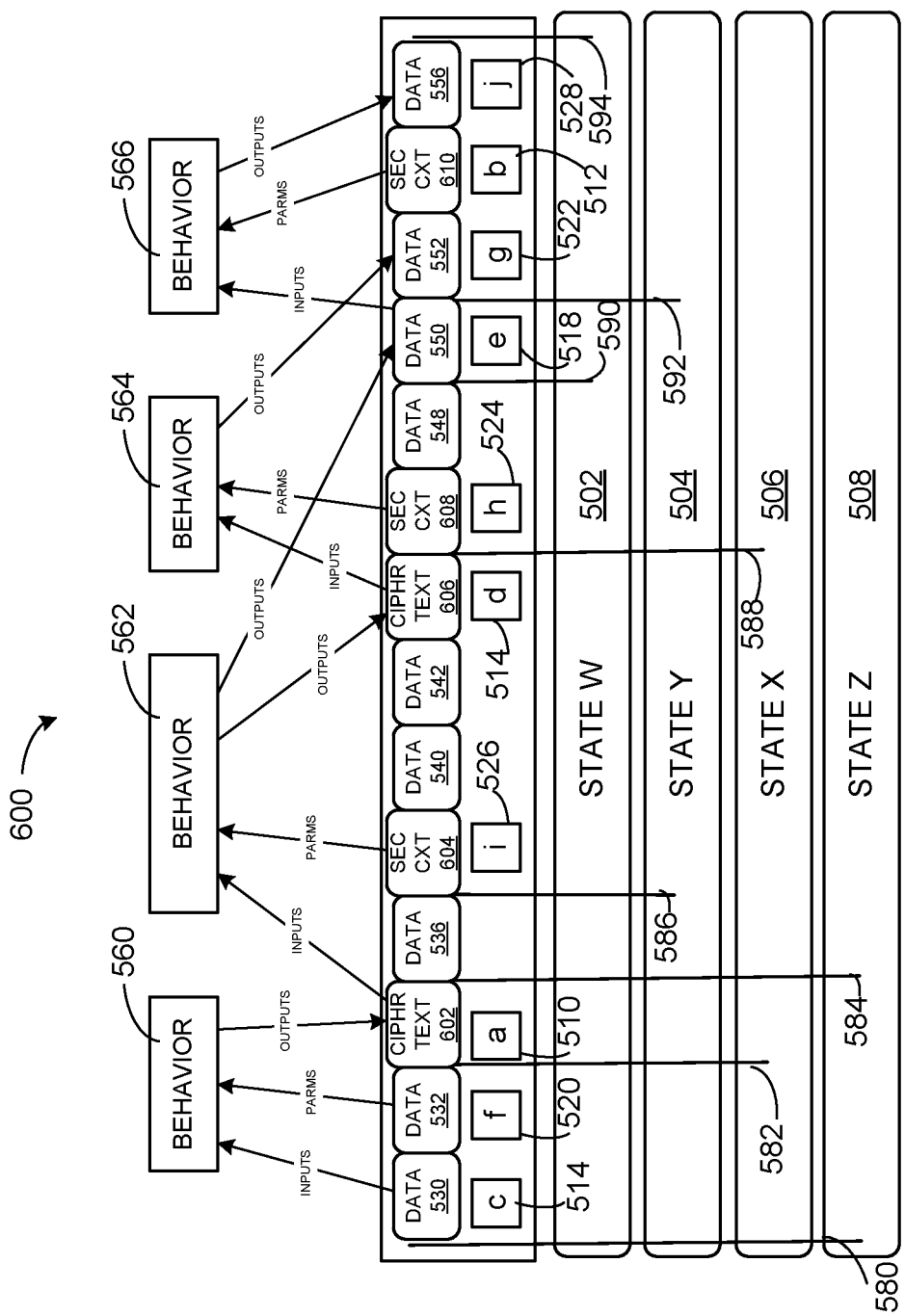
FIG. 6 illustrates an example hierarchical state machine execution plan with security-specific flows.

FIG. 6 illustrates an HSM execution plan 600 with security-specific flows. The secured HSM execution plan 600 differs from the example plan 500 in that the example flow 600 includes blocks for ciphertext data 602, 606 and security context 604, 608, 610. For example, data a 510 output from the first behavior block 560 produces ciphertext data 602. Data associated with state a 510 is the input to the second behavior block 562 and requires security context 604 as an input parameter i 526. The block i 526 can supply credentials for decrypting a 510 and access policy, for example. The second behavior block 562 produces two outputs, both cleartext data 550 corresponding to state e 518 and ciphertext data 606 corresponding to state d 516, for example. State h 524 is a security context 608 that can apply credentials and access authorization policy to the third behavior block 564 that produces state g 522 data 550 feeding as input into the fourth behavior block 566. The state b 512 security context 610 can apply access authorization policy to the cleartext (state e 518) data 550 resulting in the production of (state j 528) cleartext data 556, for example.

Thus, the execution plan 600 of the example of FIG. 6 applies hierarchical state machine execution to security key management and/or other data and/or program security technology. Program execution can be defined in terms of secure data. Cypher text 602, 606 and security context 604, 608, 610 can be used to verify that certain behavior 560-566 is acceptable to the system and will result in secure, valid execution rather than failure or entry into an error state. Thus, communication, interaction, and/or other instruction execution between IoT devices can be ensured via the HSM execution plan 600 (e.g., using cryptographic data sets, safe execution models, etc.). An IoT application instantiated as an executable HSM can be used to integrate security key management and access control policy enforcement while maintaining safe execution semantics, for example.

For example, if entry into an application state depends on decryption of application data, the decryption key must be delivered prior to entering the state. If the application successfully decrypts the data but does not successfully transition to the next state, then data can be lost (e.g., cleartext data is lost due to a power failure, etc.). The HSM guard conditions will require rollback to a previous state where it is assumed the application state does not know the ciphertext and where the cleartext must be encrypted and decryption key re-provisioned to the application state, for example. For example, if states c 514 and f 520 occur but state a 510 does not, the execution plan can roll back to indicator 580 to re-execute states c 514 and f 520.

Thus, context structures are secure contexts and help to maintain system operation over time according to the execution plan 600 for the HSM. Context structures are protected from possible corruption through race conditions, etc., using locking structures, for example. Locking structures help prevent transition into unknown states, which can occur in multi-threading and multi-core systems, for example. Context structures help to enable deterministic key management as part of the instruction execution plan flow to provide rollback and help prevent unknown/indeterminate states, for example.

Figure 7:
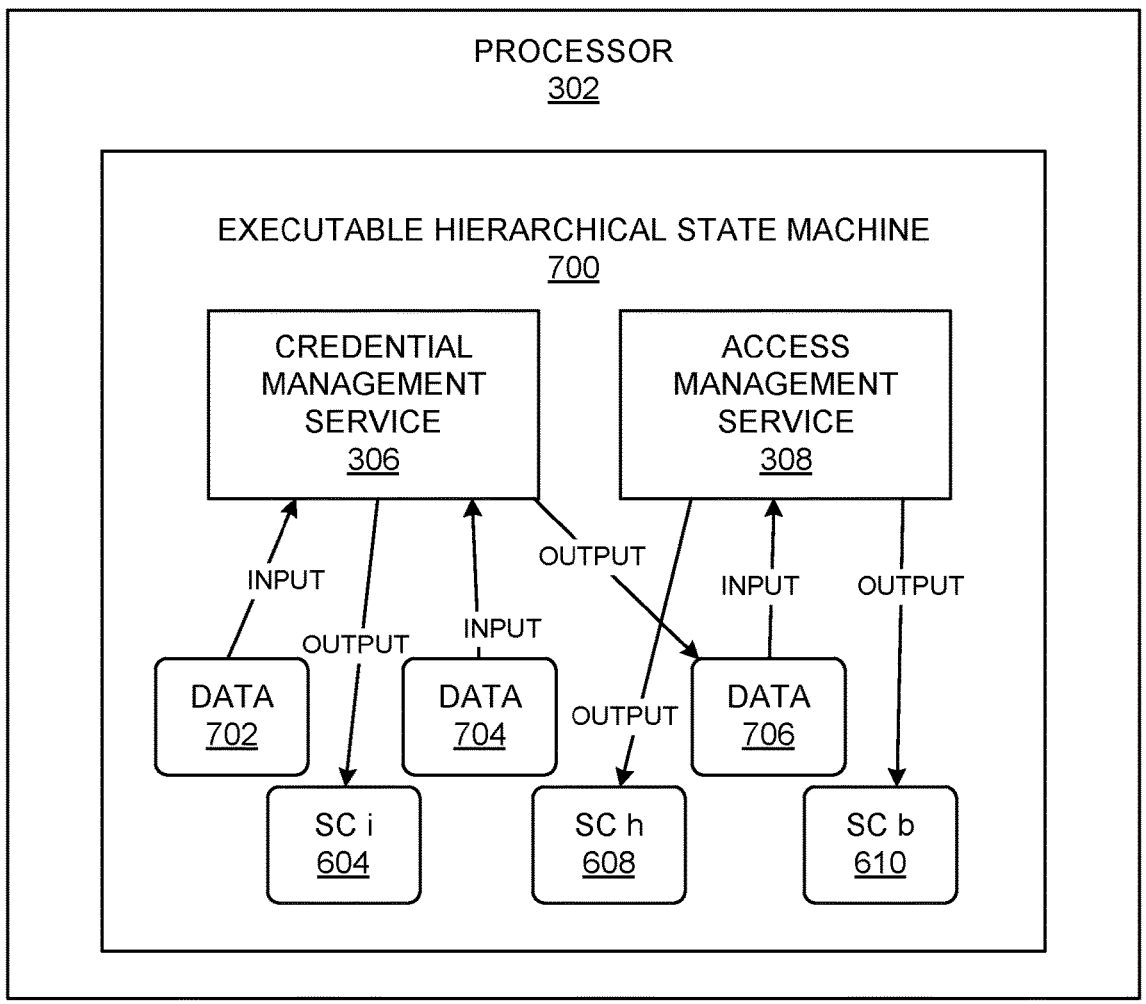
FIG. 7 depicts the example security manager of FIG. 2 implemented as an executable hierarchical state machine.

FIG. 7 illustrates an example implementation of security services of the security manager 222 expressed as an executable HSM 700. In the example of FIG. 7, security services providing credential management flow (via the credential management service 306) and access management flow (via the access management service 308) are shown as an HSM execution plan using an executable HSM system 700. The example execution plan produces three data values, SC i 604, SC h 608, and SC b 610, as output such as to the example execution plan 600. Data items 702-706 are inputs to the executable HSM application 700 (e.g., implemented using the processor 302, etc.) that integrates security into the IoT instruction process flow, for example. The output security context values 604, 608, 610 can serve as security context input for the HSM execution plan 600, for example.

The execution plan 600 can also be implemented as an executable HSM to be executed by the processor 302 of the security manager 222. Alternatively or in addition, the execution plan 600 can be implemented by the processor 202. For example, the execution plan 600 can be implemented by the request/response commander 212, alone or in conjunction with the messager 216, device manager 218, and/or other component(s) of the processor 202, generating CRUDN messages to support distributed IoT execution driven by the processor 202 of the core framework 200, etc.

Thus, as illustrated in the examples of FIGS. 6-7, state transition logic can be used to define guard conditions affecting a transition from State Z to State X and State X to State Y. The guard condition(s) mandate application of security context data (e.g., SC i 702). Since the guard condition depends on availability of the security context data (e.g., SC i 604), the HSM execution plan 600 requires execution of the HSM security services 700 of the example of FIG. 7 as a pre-requisite to execution of the second behavior block 562 in the execution plan 600 of FIG. 6, for example. Since both the HSM execution plan 600 and the executable HSM security services 700 are expressed as HSM execution plans, both 600, 700 are considered safe for automated execution.

Additionally, since the execution plan 600 depends on the security services 700, the combination of 600 and 700 is safe as well. A sequencing of instructions contained in a description of the HSM is preserved in the HSM execution plan 600, which ensures that the security context (SC i 604) is both timely and fresh. Therefore, the HSM execution 600 is assured that security credentials and policies are correct.

In certain examples, if an application designer updates an application to accomplish a different application objective, the security model 700 can be updated to accommodate change(s) to help ensure a most correct application is implemented.

By implementing computing execution process flows in a publish-subscribe model (and/or a request-response flow, application programming interface (API) flow, etc.) via an executable HSM, executable process flows can move data between states of the executable state machine in compliance with defined guard conditions. The guard conditions help ensure that the process flow can only enter or exit a given state when the defined guard condition(s) is/are met.

Guard conditions can provide security by requiring a certain key and/or a certain access control policy as guard conditions. Such guard conditions can be applied on input to a state and/or output from the state. Thus, inbound access control and outbound access control can be defined in an executable state machine model.

Using the executable HSM to define a process execution plan allows data, behavior, and desired state to be quantified and constrained to help ensure proper, reliable, and safe execution. This reliable, safe execution enables autonomous transactions and exchange of information between IoT devices without requiring manual input and without introducing errors or faults through improper execution.

In an example HSM execution plan, one or more patterns can be applied including the following terminology:

DX←BY, which indicates that "Data (X) depends on output flow from Behavior (Y)";

BY←DZ, which indicates that "Behavior (Y) depends on output flow from Data (Z)"; and DX←BY←DZ, which indicates that "State DX is reached through BY from state DZ".

In the example HSM execution plan, guard conditions can be expressed as a state dependency tuple of the form: DX←BY←DZ or, in shorthand, (DX.BY.DZ). An end state DX can have multiple dependent states (D0, D1, . . . , DZ) and (B0, B1, . . . , BY), such that (DX.BY.D0), (DX.BY.D1), . . . , (DX.BY.DZ) and (DX.B0.D0), (DX.B1.D0), . . . (DX.BY.D0) and (DX.BY.D1), (DX.BY.D2), . . . , (DX.BY.DZ) describe previous states upon which a current state depends.

The guard condition can be generally stated as:

$$\text{State } S^{ijk} = f_0^i(D) \leftarrow f_0^j(B) \leftarrow f_0^k(D) \quad \text{(Equation 1)},$$

for all data D and behavior B in a system. For a given state $S^{ijk}$ there is another state $S^{(ijk+1)}$ in which $S^{ijk} \leftarrow S^{(ijk+1)}$, such that $S^{(ijk+1)}$ is a security state machine guard condition (SSMGC) controlling access to $S^{ijk}$. That is, state $S^{(ijk+1)}$ is to be satisfied to reach state $S^{ijk}$. Hence, for every safe HSM execution plan, there exists a secure HSM execution plan that is also safe. Therefore, when a Publication to Subscribers depends on any Registrant or Registrar data item described above, a secure HSM execution plan can be found that satisfies the publication security requirements.

In certain examples, the secure HSM publish-subscribe execution plan can be applied to distributed ledger use cases (also known as blockchain). For example, an HSM execution plan can be used to define a type of blockchain referred to as electronic contracts (e-contracts), which can be involved in a distributed ledger, by designing an HSM that implements the e-contract and includes electronic wallet (e-wallet) and key management interactions. An e-contract is series of steps and/or actions in which data flows between particular principles that produce particular outcomes. Principles and outcomes may or may not be deterministic in an e-contract (e.g., having no randomness and always producing the same output in response to the same input). For example, Etherium e-contracts can have randomness issues, so an HSM execution plan can be applied to e-contracts associated with Etherium to address the Etherium by producing a deterministic protocol to be applied to Etherium e-contracts.

Input, parameter, and output flows can be retrofitted to represent and/or otherwise correspond to equivalent primitives (e.g., low-level algorithms and/or computer code segments) in the distributed ledger. For example, cryptographic primitives such as hash functions, encryption functions, digital signature algorithms, ring signatures, threshold signatures, bit commitment schemes, zero knowledge proof techniques, multi-party computation, quantum-resistant algorithms, etc., can be classified as behaviors 560-566 with certain input(s), parameter(s), and output(s) defined as a secure HSM execution plan 600. Data 530-556 associated with different states 510-528 can be used with behaviors 560-566 to drive outputs and associated changes in state 510-528 according to different security contexts 604-610 forming a secure distributed ledger transaction, for example.

Thus, in certain examples, a serialized execution plan can be committed to a blockchain such that all blockchain miners agree to the execution plan. Subsequently, the blockchain miners can be informed of each step in the execution plan. A condition of blockchain block commitment can be further agreed upon by each miner by verifying that the previously committed sequence of blocks contains a correct sequence according to the execution plan. Furthermore, a next block to be committed can be evaluated to confirm that the block contains a state transition that agrees with the execution plan. If a rollback is detected, the rolled back state agrees with the execution plan according to miner consensus.

The example HSM executable 700 can be used to implement the credential management service 306 and the access management service 308 as different behaviors driven by input data 702-706 to provide output security context 604-610 (and/or cypher text, etc.) to provide guard conditions for execution of the HSM execution plan 600, etc.

Thus, rather than providing for instruction execution without predictability and without a security mechanism to help ensure the instruction execution does not end in failure, thereby disrupting a distributed ledger computation and/or other IoT device flow, certain examples solve those technical problems by providing a technical solution to improve the function of an IoT and/or other computing system by converting a plan for program/instruction execution into a hierarchical state machine-driven execution plan with a hierarchy of data, security context, and/or other guard condition based on one or more nested states forming input(s) and parameter(s) to drive executable application behavior and provide output(s) for next action(s) in the program execution plan. Such examples alter program execution behavior and provide improved, robust security and reliability to help ensure behaviors and associated states are not achieved without satisfying defined input and/or output guard conditions to ensure program execution reliability and security, thus helping to prevent system failure or indeterminate execution, for example.

While an example implementation of the security manager 222 of FIGS. 2-3 is illustrated in FIG. 7, one or more of the elements, processes and/or devices illustrated in FIG. 7 may be combined, divided, re-arranged, omitted, eliminated and/or implemented in any other way. Further, the example executable HSM 700, the example processor 302, the example data storage 304, the example credential message service 306, the example access management service 308, and/or, more generally, the example security manager 222 of FIGS. 2, 3, and/or 7 can be implemented by hardware, software, firmware and/or any combination of hardware, software and/or firmware. Thus, for example, any of the example executable HSM 700, the example processor 302, the example data storage 304, the example credential message service 306, the example access management service 308, and/or, more generally, the example security manager 222 of FIGS. 2, 3, and/or 7 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example executable HSM 700, the example processor 302, the example data storage 304, the example credential message service 306, the example access management service 308, and/or, more generally, the example security manager 222 of FIGS. 2, 3, and/or 7 is/are hereby expressly defined to include a non-transitory computer readable storage device or storage disk such as a memory, a digital versatile disk (DVD), a compact disk (CD), a Blu-ray disk, etc. including the software and/or firmware. Further still, the example security manager 222 can include one or more elements, processes and/or devices in addition to, or instead of, those illustrated in FIGS. 2, 3, and/or 7, and/or may include more than one of any or all of the illustrated elements, processes and devices.

Figure 8:
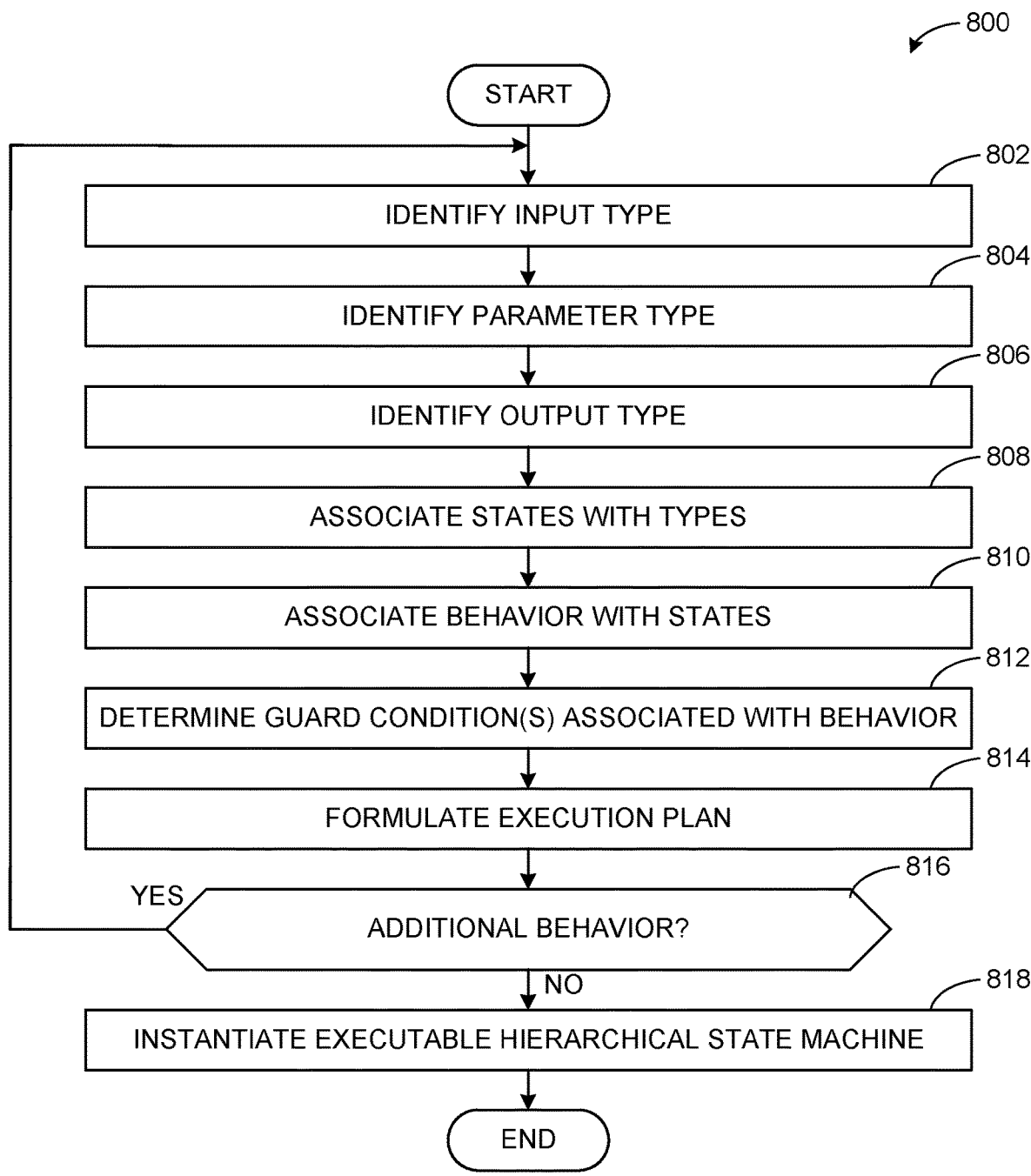
FIGS. 8-9 illustrate flow diagrams representative of example machine readable instructions that can be executed to implement the example systems of FIGS. 1-7.
Figure 9:
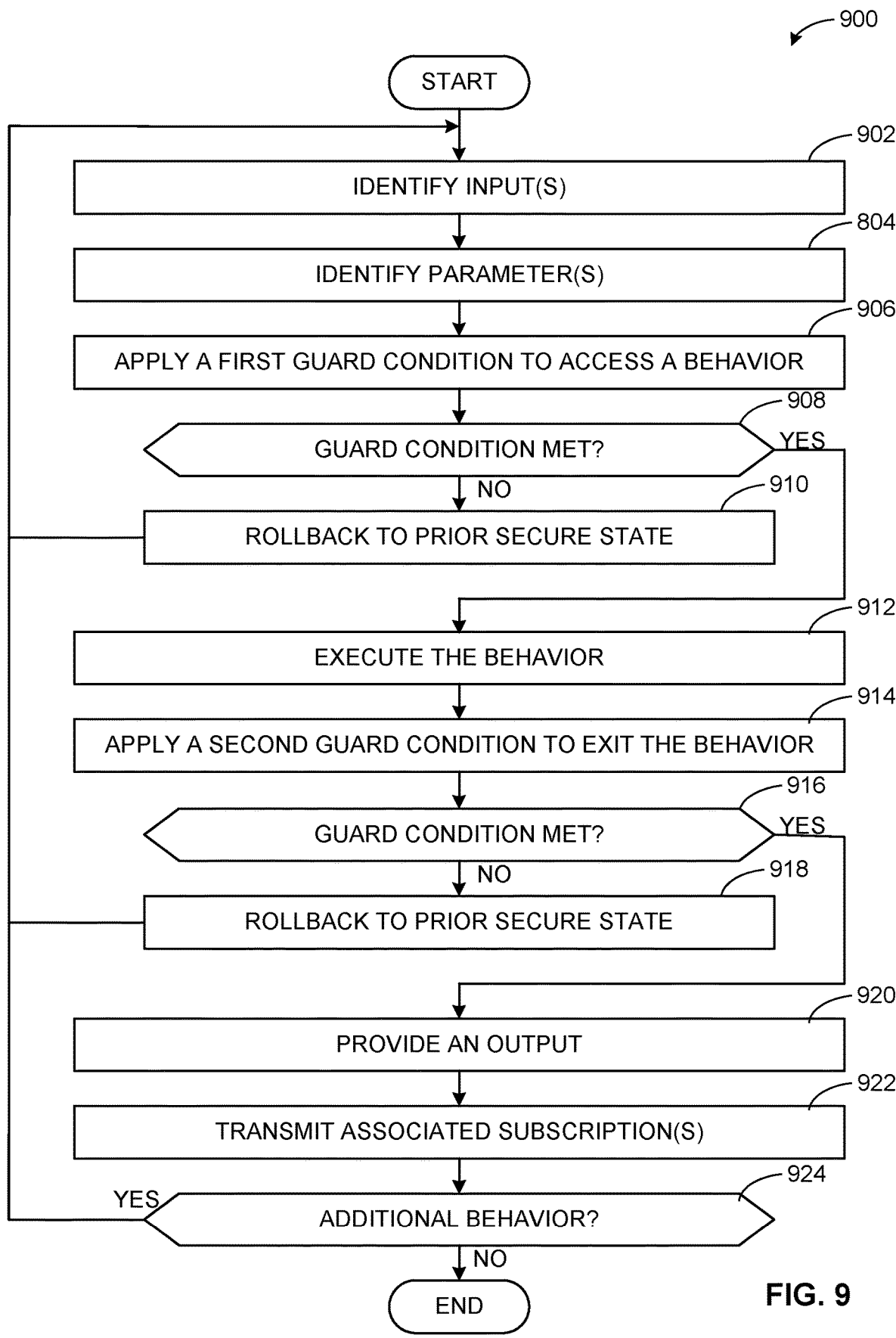

Flowcharts representative of example machine readable instructions for implementing the example security manager 222 of FIGS. 2, 3, and/or 7 are shown in FIGS. 8-9. In this example, the machine-readable instructions include a program for execution by a processor such as a processor 1012 shown in the example processor platform 1000 discussed below in connection with FIG. 10. The program can be embodied in software stored on a non-transitory computer readable storage medium such as a CD-ROM, a floppy disk, a hard drive, a DVD, a Blu-ray disk, or a memory associated with the processor 1012, but the entire program and/or parts thereof can alternatively be executed by a device other than the processor 1012 and/or embodied in firmware or dedicated hardware. Further, although the example program is described with reference to the flowchart illustrated in FIG. 10, many other methods of implementing the example security manager 222 of FIGS. 2, 3, and/or 7 can alternatively be used. For example, the order of execution of the blocks may be changed, and/or some of the blocks described can be changed, eliminated, or combined. Additionally or alternatively, any or all of the blocks can be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 8-9 can be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc., can be present without falling outside the scope of the corresponding claim. As used herein, when the phrase "at least" is used as the transition term in a preamble of a claim, it is open ended in the same manner as the term "comprising" and "including" are open ended.

Example machine readable instructions for implementing the security manager 222 of FIGS. 2, 3, and/or 7 and that can be executed to perform hierarchical state machine-driven program development and execution are illustrated in FIGS. 8-9. With reference to the preceding figures and associated descriptions, the example machine readable instructions 800 to generate an executable HSM instruction execution plan begins at block 802. At block 802, an input type is identified. For example, an input type can include a term for an electronic contract in a distributed ledger IoT system of devices. An input type can include an interface for communication between IoT devices, for example. An input type can include payload data, ciphertext data, and/or other data to be used in a current or subsequent behavior, for example. At block 804, a parameter type is identified. For example, a parameter type can include a security context, other behavior setting, etc. At block 806, an output type is identified. For example, an output can be a data value, ciphertext, etc. An output for one behavior can be an input and/or parameter for another behavior, for example.

At block 808, a first state 510-528 is associated with the input type, and a second state 510-528 is associated with the parameter type, and a third state 510-528 is associated with the output type. Thus, the input type, parameter type, and output type can be defined as states 510-528 in the hierarchical state machine 600.

At block 810, a behavior 560-566 is associated to transition from the first state to the third state. For example, a security check, encryption, and/or other operation can define a behavior to be apply to the input(s) based on the parameter(s) to generate the output(s). The behavior ties the elements together to generate a result, and publishers and subscribers can receive result(s) and/or other component(s) of the behavior (e.g., output, input, parameter, etc.).

At block 812, guard condition(s) associated with the behavior, such as a first guard condition to leave the first state and a second guard condition to enter the third state, are determined. For example, the input and/or output may be required to satisfy a condition/criterion in order to enter the behavior state and/or exit the behavior state. A value, a threshold, a range, a comparison, etc., can be determined to allow the behavior to regulate state transitions based on input and/or output values. For example, guard conditions can be associated with the states representing input, parameter, and/or output values and the conditions must be satisfied to transition into and/or out of the given state.

At block 814, an execution plan is formulated based on the first state, first guard condition, second state, behavior, third state, and second guard condition. For example, the input, parameter, and output types and associated states and guard condition(s) form the HSM execution plan 600 to guide processor and/or other computing device (e.g., IoT device, etc.) execution of instructions according to the states and conditions defined in the plan. Guard conditions are organized to be processed as critical sections to preserve ordering according to the sequence specified by the states 510-528 and behaviors 560-566 in the HSM execution plan 600. Thus, the guard conditions can be used to enforce a predictable, verifiable, secure, and reliable ordering of operations in an instruction execution flow.

At block 816, control reverts to block 802 to repeat the process for each additional behavior available. Thus, multiple behaviors 560-566 (e.g., multiple instruction primitives, code segments, etc.) can be connected together based on inputs, parameters, and outputs. A first behavior's 560 output 602 can be a second behavior's 562 input, for example. Once all applicable behaviors 560-566 have been processed with their respective states into the execution plan, control proceeds to block 818.

At block 818, an executable hierarchical state machine is instantiated using the formulated execution plan 600 for deployment to be executed on a processor 1012 and/or other computing device. For example, the core framework 200 can facilitate communication and/or other operation between IoT devices, and the security manager 222 can provided integrated operational security and reliability with the communication/operation using the executable HSM 700 and associated execution plan 600. Devices and/or associated computing processes can be publishers to provide data and/or instructions and/or subscribers to receive data and/or instructions associated with the defined behaviors 560-566, for example. Subscription topics can include input flows, parameter flows, output flows, etc.

FIG. 9 illustrates a flow diagram representing example machine readable instructions 900 to facilitate execution of the HSM execution plan 600 via the executable HSM 700. At block 902, input(s) are identified in the HSM execution plan 600. For example, data input 530 associated with a state c 514 is identified in the execution plan 600. In some examples, an output of a first behavior becomes an input of a second behavior, for example. At block 904, parameter(s) are identified in the execution plan 600. For example, a data parameter 532 associated with a state f 520 is identified in the execution plan 600. A security context generated by the credential management service 304 and/or the access management service 304 of the executable HSM 700 can become a parameter for behavior(s) 560-566 in the execution plan 600, for example.

At block 906, a first guard condition to access a behavior 560-566 from a first state 510-528 is applied. For example, input(s) and parameter(s) are analyzed with respect to their associated information 530-566 and/or 602-610 and corresponding states 510-528 to determine guard condition(s) or requirements that are to be satisfied by the input and/or parameter to enter a behavior 560-566 and/or corresponding state 510-528. For example, a security context can supply credentials for decrypting ciphertext and an associated access policy. A security context can apply credentials and an access management policy from one behavior 560-566 which provides an output to drive an input at another behavior 560-566, for example. Thus, proper access, encryption/decryption, and sequence of events can be driven by the execution plan.

At block 908, if the first guard condition is not met, then, at block 910, execution rolls back to a prior secure state. For example, control reverts back to block 902 to restart the process. Alternatively, control can revert to another prior, known, secure state to resume the execution plan from that state. Thus, stale security and/or other erroneous state(s) can be avoided.

If the guard condition is met, then, at block 912, the behavior 560-566 is executed. For example, credentials can be applied to verify access and decrypt data. Authorization can allow input data to be transformed into output data and provided to a user, next behavior 560-566, etc.

At block 914, a second guard condition to exit the behavior 560-566 and enter a second state 510-528 following completion of the behavior 560-566 is applied. For example, an access condition can be applied to generate an output of the behavior 560-566 to properly propagate the output in the execution plan 600. A decryption can be applied to ensure an output is processable and/or otherwise intelligible for further application in the execution plan 600.

At block 916, if the second guard condition is not met, then, at block 918, execution rolls back to a prior secure state. For example, control reverts back to block 902 to restart the process. Alternatively, control can revert to another prior, known, secure state to resume the execution plan from that state. Thus, stale security and/or other erroneous state(s) can be avoided.

If the guard condition is met, then, at block 920, an output is provided at the second state 510-528. For example, decrypted data is provided from the behavior 560-566 to a next state 510-528. A ciphertext 602, 606 is generated as input to a next behavior 562, 564, for example. Output data is generated by the behavior 562 to become input for the behavior 566, for example. Output can be provided to a device and/or other process (e.g., via a subscription, etc.), for example.

At block 922, associated subscriptions are transmitted. For example, one or more publishers and/or subscribers can receive an input flow, parameter flow, and/or output flow as a result of behavior execution. Subscription information can be transmitted with the output, at the time of guard condition application, dynamically upon generation and/or receipt of each input, parameter, and/or output, etc. Thus, devices, programs, etc., can receive data and/or instruction outcome(s) of the behavior- and state-driven execution plan 600 to facilitate system operation such as IoT device communication, program execution, device synchronization, etc.

At block 924, execution of the execution plan 600 continues as long as behaviors 560-566 remain. Otherwise, the process ends. Thus, the HSM execution plan 600 implemented by and/or in conjunction with the HSM executable 700 of the security manager 222 and/or another executable HSM facilitates orderly, reliable, and secure program execution in an IoT and/or other environment.

Figure 10:
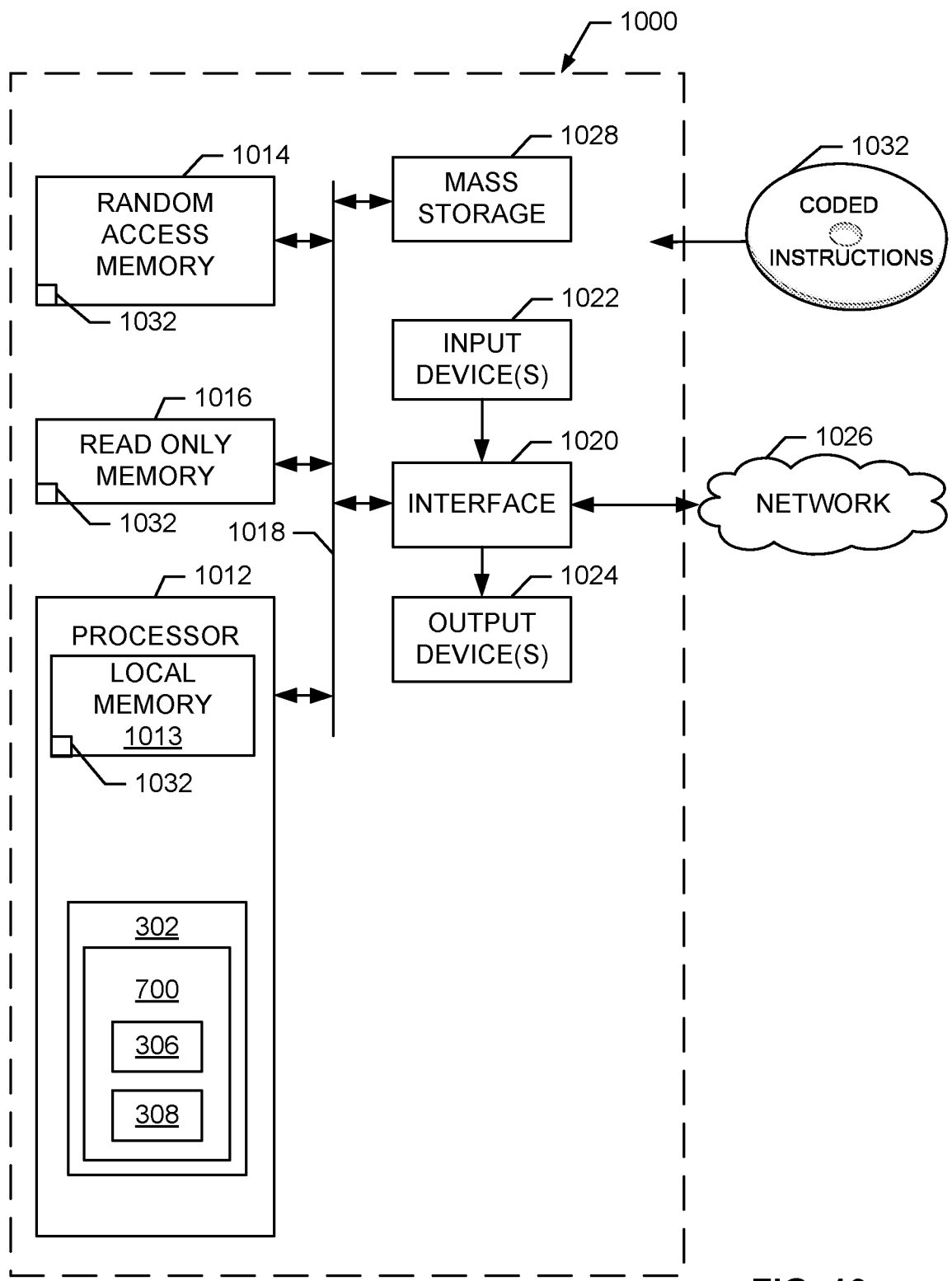
FIGS. 10-11 are schematic illustrations of example processor platforms that can execute the instructions of FIGS. 8-9 to implement the example systems of FIGS. 1-7.

FIG. 10 is a block diagram of an example processor platform 1000 capable of executing the instructions of FIGS. 8-9 to implement the systems of FIGS. 1-7. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example, the processor 1012 is structured to include the example processor 302 including the example executable HSM 700 with example credential management service 306 and access management service 308, etc.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM), 3D XPoint (such as Intel Optane™, Micron QuantX™, etc.) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit

1020 may be implemented by any type of interface standard, such as an Ethernet interface, a universal serial bus (USB), and/or a peripheral component interconnect (PCI) express interface.

In the illustrated example, one or more input devices 1022 are connected to the interface circuit 1020. The input device(s) 1022 permit(s) a user to enter data and commands into the processor 1012. The input device(s) 1022 can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 5-7 may be stored in the mass storage device 1028, in the volatile memory 1014, in the non-volatile memory 1016, and/or on a removable tangible computer readable storage medium such as a CD or DVD.

Figure 11:
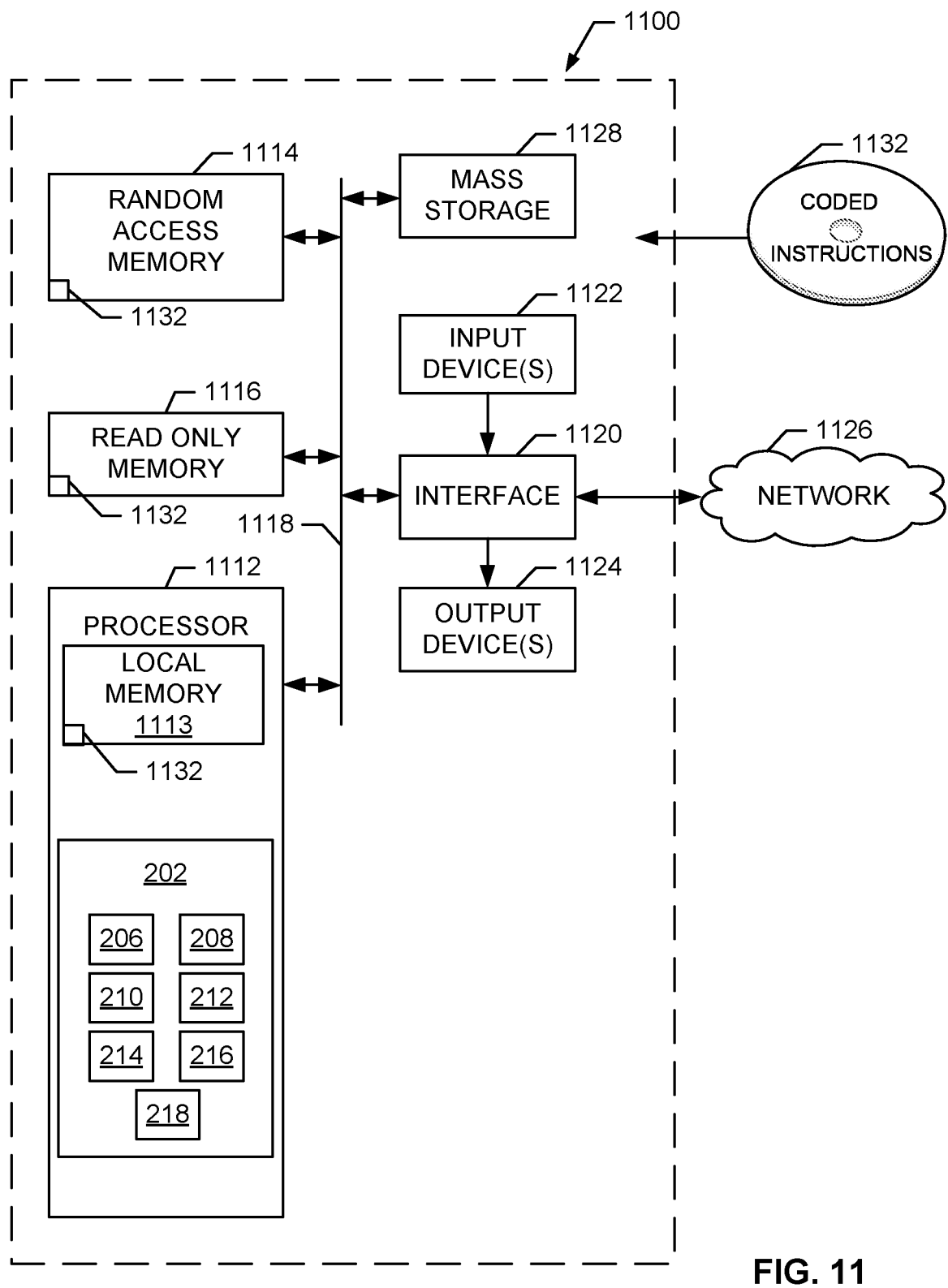

FIG. 11 is a block diagram of an example processor platform 1100 capable of executing the instructions of FIGS. 8-9 to implement the systems of FIGS. 1-7. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example, the processor 1112 is structured to include the example processor 202 and its constituent elements such as the example addressor 206, the example protocol bridge 208, the example common resource model 210, the example request/response commander 212, the example device discoverer 214, the example messager 216, the example device manager 218, etc.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM), 3D XPoint (such as Intel Optane™, Micron QuantX™, etc.) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a peripheral component interconnect (PCI) express interface.

In the illustrated example, one or more input devices 1122 are connected to the interface circuit 1120. The input device(s) 1122 permit(s) a user to enter data and commands into the processor 1112. The input device(s) 1122 can be implemented by, for example, an audio sensor, a microphone, a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 5-7 may be stored in the mass storage device 1128, in the volatile memory 1114, in the non-volatile memory 1116, and/or on a removable tangible computer readable storage medium such as a CD or DVD.

Figure 12:
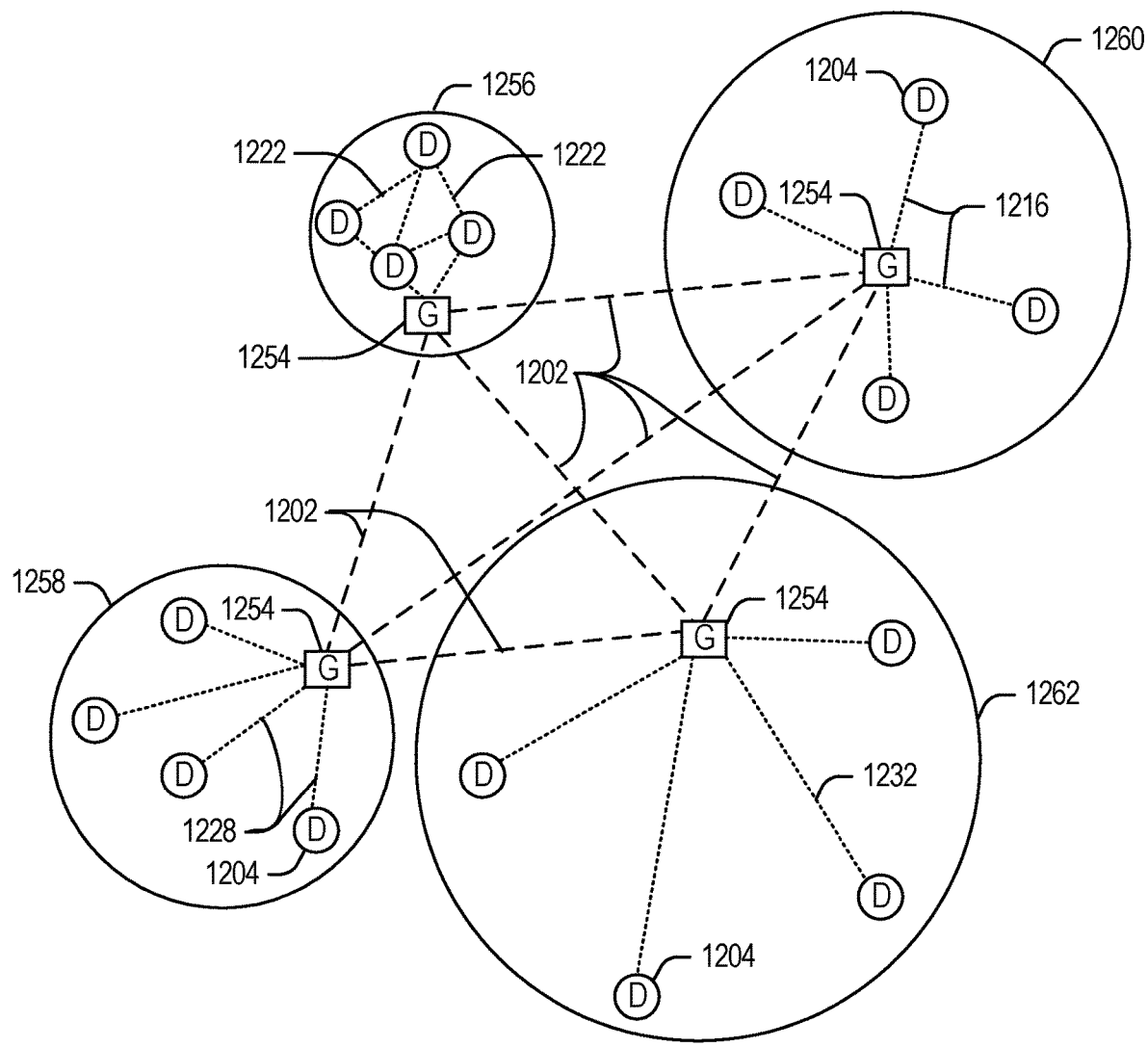
FIG. 12 illustrates an example domain topology for respective internet-of-things (IoT) networks coupled through links to respective gateways.

FIG. 12 illustrates an example domain topology for respective internet-of-things (IoT) networks coupled through links to respective gateways. In certain examples, the IoT involves a large number of computing devices interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced herein, present a number of new challenges in a heterogeneous network of connectivity comprising a combination of wired and wireless technologies.

FIG. 12 provides a simplified drawing of a domain topology that can be used for a number of IoT networks including IoT devices 1204 (e.g., an example of the processor platform 1100, etc.), with the IoT networks 1256, 1258, 1260, 1262, coupled through backbone links 1202 to respective gateways 1254. For example, a number of IoT devices 1204 can communicate with a gateway 1254, and with each other through the gateway 1254. To simplify the drawing, not every IoT device 1204, or communications link (e.g., link 1216, 1222, 1228, or 1232) is labeled. The backbone links 1202 may include any number of wired or wireless technologies, including optical networks, and may be part of a local area network (LAN), a wide area network (WAN), or the Internet. Additionally, such communication links facilitate optical signal paths among both IoT devices 1204 and gateways 1254, including the use of MUXing/deMUXing components that facilitate interconnection of the various devices.

The network topology may include any number of types of IoT networks, such as a mesh network provided with the network 1256 using Bluetooth low energy (BLE) links 1222. Other types of IoT networks that may be present include a wireless local area network (WLAN) network 1258 used to communicate with IoT devices 1204 through IEEE 802.11 (Wi-Fi®) links 1228, a cellular network 1260 used to communicate with IoT devices 1204 through an LTE/LTE-A (4G) or 5G cellular network, and a low-power wide area (LPWA) network 1262, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks can also be integrated with coordinator devices that provide a chain of links that forms cluster tree of linked devices and networks.

Each of these IoT networks can provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1204, such as over the backbone links 1202, can be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This can allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks can be further enhanced by the integration of sensing technologies, such as sound, light, electronic traffic, facial and pattern recognition, smell, vibration, into the autonomous organizations among the IoT devices. The integration of sensory systems can allow systematic and autonomous communication and coordination of service delivery against contractual service objectives, orchestration and quality of service (QoS) based swarming and fusion of resources. Some of the individual examples of network-based resource processing include the following.

The mesh network 1256, for instance, can be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1258, for instance, can use systems that perform standards conversion to provide multi-standard connectivity, enabling IoT devices 1204 using different protocols to communicate. Further systems may provide seamless interconnectivity across a multi-standard infrastructure comprising visible Internet resources and hidden Internet resources.

Communications in the cellular network 1260, for instance, may be enhanced by systems that offload data, extend communications to more remote devices, or both. The LPWA network 1262 can include systems that perform non-Internet protocol (IP) to IP interconnections, addressing, and routing. Further, each of the IoT devices 1204 may include the appropriate transceiver for wide area communications with that device. Further, each IoT device 1204 can include other transceivers for communications using additional protocols and frequencies.

Finally, clusters of IoT devices can be equipped to communicate with other IoT devices as well as with a cloud network. This can allow the IoT devices to form an ad-hoc network between the devices, allowing them to function as a single device, which may be termed a fog device. This configuration is discussed further with respect to FIG. 13 below.

Figure 13:
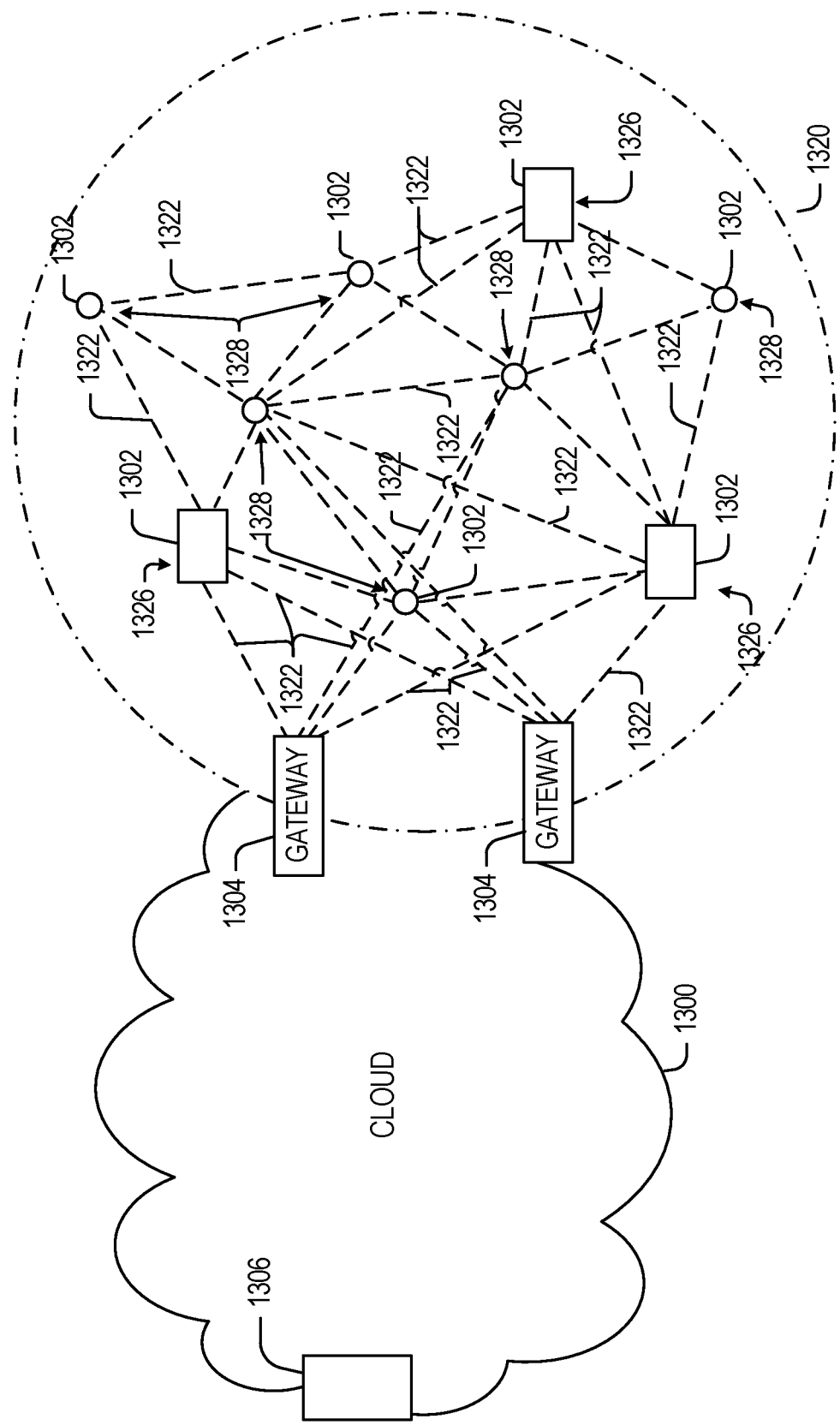
FIG. 13 illustrates a cloud computing network in communication with a mesh network of IoT devices operating as a fog device at the edge of a cloud computing network.

FIG. 13 illustrates a cloud computing network in communication with a mesh network of IoT devices (devices 1302) operating as a fog device at the edge of the cloud computing network. The mesh network of IoT devices may be termed a fog 1320, operating at the edge of the cloud 1300. To simplify the diagram, not every IoT device 1302 is labeled.

The fog 1320 can be considered to be a massively interconnected network wherein a number of IoT devices 1302 are in communications with each other, for example, by radio links 1322. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 1302 are shown in this example, gateways 1304, data aggregators 1326, and sensors 1328, although any combinations of IoT devices 1302 and functionality may be used. The gateways 1304 may be edge devices that provide communications between the cloud 1300 and the fog 1320 and can also provide the backend process function for data obtained from sensors 1328, such as motion data, flow data, temperature data, and the like. The data aggregators 1326 can collect data from any number of the sensors 1328 and perform the back end processing function for the analysis. The results, raw data, or both can be passed along to the cloud 1300 through the gateways 1304. The sensors 1328 can be full IoT devices 1302, for example, capable of both collecting data and processing the data. In some cases, the sensors 1328 can be more limited in functionality, for example, collecting the data and allowing the data aggregators 1326 or gateways 1304 to process the data.

Communications from any IoT device 1302 can be passed along a convenient path (e.g., a most convenient path) between any of the IoT devices 1302 to reach the gateways 1304. In these networks, the number of interconnections provide substantial redundancy, allowing communications to be maintained, even with the loss of a number of IoT devices 1302. Further, the use of a mesh network can allow IoT devices 1302 that are very low power or located at a distance from infrastructure to be used, as the range to connect to another IoT device 1302 can be much less than the range to connect to the gateways 1304.

The fog 1320 provided from these IoT devices 1302 can be presented to devices in the cloud 1300, such as a server 1306, as a single device located at the edge of the cloud 1300, e.g., a fog device. In this example, the alerts coming from the fog device may be sent without being identified as coming from a specific IoT device 1302 within the fog 1320. In this fashion, the fog 1320 can be considered a distributed platform that provides computing and storage resources to perform processing or data-intensive tasks such as data analytics, data aggregation, and machine-learning, among others.

In some examples, the IoT devices 1302 can be configured using an imperative programming style, e.g., with each IoT device 1302 having a specific function and communication partners. However, the IoT devices 1302 forming the fog device can be configured in a declarative programming style, allowing the IoT devices 1302 to reconfigure their operations and communications, such as to determine needed resources in response to conditions, queries, and device failures. As an example, a query from a user located at a server 1306 about the operations of a subset of equipment monitored by the IoT devices 1302 can result in the fog 1320 device selecting the IoT devices 1302, such as particular sensors 1328, needed to answer the query. The data from these sensors 1328 can then be aggregated and analyzed by any combination of the sensors 1328, data aggregators 1326, or gateways 1304, before being sent on by the fog 1320 device to the server 1306 to answer the query. In this example, IoT devices 1302 in the fog 1320 can select the sensors 1328 used based on the query, such as adding data from flow sensors or temperature sensors. Further, if some of the IoT devices 1302 are not operational, other IoT devices 1302 in the fog 1320 device can provide analogous data, if available.

From the foregoing, it will be appreciated that the above disclosed methods, apparatus and articles of manufacture facilitate security protocol execution in a hierarchical state machine-driven execution plan. For example, safe execution of security protocols in an autonomous goal-oriented IoT execution plan is disclosed and described herein.

In distributed computing, different devices can be orchestrated (e.g., configured to work together). An orchestration or execution plan for the devices is used to help ensure that the devices can communicate with each other and work properly in execution of the instructions. However, if the distributed system and/or individual computing devices are bound into an unknown state (e.g., when an execution fails, timing is incorrect and/or otherwise does not synchronize among devices, etc.), operation becomes non-deterministic and can enter an unplanned state.

To remedy this dangerous deficiency and improve distributed computing technology (e.g., in the Internet of Things, etc.), a secure execution plan is generated and provided as a hierarchical state machine made executable to drive instruction execution according to included states, transitions between states, associated behavior, etc. Integrated guard conditions such as security context, key management, and/or other constraints helps ensure that the system does not enter an undeterministic state during program execution.

Using a credential management service and an access management service, a security goal can be applied to perform credential management and access control on incoming data. Management behavior operates in parallel with instruction execution to product a security context input into the execution plan. Security management can be driven by defining a hierarchical state machine that describes key management, access management, etc., into data flows to provide a safe, secure, reliable software program execution flow.

Rather than separate execution and security flows, the flows are integrated. Thus, execution and behavior are made more robust as well as expedited. Additionally, analysis tools can examine a system to determine whether safety issues exist for an entire protocol. Rather than making assumptions regarding integration points between flows, flows are constructed as a whole in an HSM to allow protocols to be integrated and evaluated according to an HSM model.

Guard conditions establish criteria for entering and/or existing a state as well as providing security based on authentication key and/or other credential plus access control policy applied on input and/or output from a state. Inbound and/or outbound access control is integrated into the executable HSM model and associated execution plan. Such a model/plan can be applied to a variety of flows such as a publish/subscribe instruction/data flow, a request/response flow, an application programming interface (API) flow, etc., for a variety of data in a distributed system of devices such as IoT devices, etc.

Thus, certain examples provide key management with safety properties including deterministic program state execution, inability to enter an unknown or indeterminate state, ability to rollback to a known state in the event of a failure, etc. Since security and other instruction execution is integrated in an HSM execution plan, the whole system is viewed as secure. The execution plan is deterministic because it is serialized over time, as shown in the examples of FIGS. 5-7 showing a serialized representation of the HSM over time.

Example 1 includes an apparatus including a security manager to integrate a security service with an instruction execution flow in a distributed device environment. The example security manager is to include a processor configured to implement at least an executable hierarchical state machine to provide credential management and access management in conjunction with instruction execution according to an execution plan. The executable hierarchical state machine is to generate a security context for the execution plan to implement a guard condition governing a transition from a first state to a second state in accordance with the execution plan.

Example 2 includes Example 1, wherein the first state includes an input state and the second state includes an output state.

Example 3 includes Example 2, wherein the execution plan includes a behavior receiving an input from the first state to generate an output at the second state.

Example 4 includes Example 3, wherein the behavior is a first behavior and wherein the output forms an input to a second behavior.

Example 5 includes Example 1, wherein the security context provides key management and access control policy enforcement.

Example 6 includes Example 1, wherein the guard condition is to be expressed as a state dependency tuple describing one or more previous states upon which a current state depends.

Example 7 includes Example 1, wherein a failure of the guard condition is to trigger a rollback to a secure state.

Example 8 includes Example 1, wherein the execution plan is to be implemented according to a publish-subscribe model, and wherein publishers and subscribers receive information regarding at least one of input to and output from according to a subscription.

Example 9 includes Example 8, wherein the subscription includes at least one of an input flow, a parameter flow, or an output flow.

Example 10 includes one or more of Examples 1-9, wherein the execution plan is to implement a distributed ledger.

Example 11 includes Example 10, wherein the distributed ledger includes a blockchain.

Example 12 includes Example 11, wherein the blockchain includes an electronic contract.

Example 13 includes a tangible computer-readable storage medium comprising computer readable instructions which, when executed, cause a processor to implement at least a security manager to integrate a security service with an instruction execution flow in a distributed device environment. The security manager is to include an executable hierarchical state machine to provide credential management and access management in conjunction with instruction execution according to an execution plan. The executable hierarchical state machine is to generate a security context for the execution plan to implement a guard condition governing a transition from a first state to a second state in accordance with the execution plan.

Example 14 includes Example 13, wherein the first state includes an input state and the second state includes an output state.

Example 15 includes Example 14, wherein the execution plan includes a behavior receiving an input from the first state to generate an output at the second state.

Example 16 includes Example 15, wherein the behavior is a first behavior and wherein the output forms an input to a second behavior.

Example 17 includes Example 13, wherein the security context provides key management and access control policy enforcement.

Example 18 includes Example 13, wherein the guard condition is to be expressed as a state dependency tuple describing one or more previous states upon which a current state depends.

Example 19 includes Example 13, wherein a failure of the guard condition is to trigger a rollback to a secure state.

Example 20 includes Example 13, wherein the execution plan is to be implemented according to a publish-subscribe model, and wherein publishers and subscribers receive information regarding at least one of input to and output from according to a subscription.

Example 21 includes Example 20, wherein the subscription includes at least one of an input flow, a parameter flow, or an output flow.

Example 22 includes a method to integrate a security service with an instruction execution flow in a distributed device environment. The method includes generating, by executing an instruction with a processor, a security context to implement a guard condition. The method includes providing, by executing an instruction with the processor, the security context to a hierarchical state machine to implement the guard condition to govern a transition from a first state to a second state in accordance with the execution plan. In the method, the processor provides an executable hierarchical state machine including credential management and access management in conjunction with instruction execution according to the execution plan.

Example 23 includes Example 22, further including executing, as part of the execution plan a behavior based on an input received at a first state to generate an output at a second state.

Example 24 includes Example 22, wherein the execution plan is to be implemented according to a publish-subscribe model, and wherein publishers and subscribers receive information regarding at least one of input to and output from according to a subscription.

Example 25 includes Example 24, wherein the subscription includes at least one of an input flow, a parameter flow, or an output flow.

Example 26 includes Example 22, further including triggering a rollback to a secure state upon a failure of the guard condition.

Example 27 includes an apparatus including a means for generating a security context to implement a guard condition; and a means for providing the security context to a hierarchical state machine to implement the guard condition to govern a transition from a first state to a second state in accordance with the execution plan.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a security manager to integrate a security service with an instruction execution flow in a distributed device environment, the security manager to include:
memory; and
a processor configured to implement at least:
an executable hierarchical state machine to provide credential management and access management in conjunction with instruction execution according to an execution plan,
the executable hierarchical state machine to generate a security context for the execution plan to implement a guard condition governing a transition from a first state to a second state in accordance with the execution plan.

2. The apparatus of claim 1, wherein the first state includes an input state and the second state includes an output state.

3. The apparatus of claim 2, wherein the execution plan includes a behavior receiving an input from the first state to generate an output at the second state.

4. The apparatus of claim 3, wherein the behavior is a first behavior and the input is a first input, and wherein the output forms a second input to a second behavior.

5. The apparatus of claim 1, wherein the security context provides key management and access control policy enforcement.

6. The apparatus of claim 1, wherein the guard condition is to be expressed as a state dependency tuple describing one or more previous states upon which a current state depends.

7. The apparatus of claim 1, wherein a failure of the guard condition is to trigger a rollback to a secure state.

8. The apparatus of claim 1, wherein the execution plan is to be implemented according to a publish-subscribe model, and wherein publishers and subscribers receive information regarding at least one of input to and output from according to a subscription.

9. The apparatus of claim 8, wherein the subscription includes at least one of an input flow, a parameter flow, or an output flow.

10. The apparatus of claim 1, wherein the execution plan is to implement a distributed ledger.

11. The apparatus of claim 10, wherein the distributed ledger includes a blockchain.

12. The apparatus of claim 11, wherein the blockchain includes an electronic contract.

13. A non-transitory computer-readable medium comprising computer readable instructions which, when executed, cause a processor to implement at least:
a security manager to integrate a security service with an instruction execution flow in a distributed device environment, the security manager to include:
an executable hierarchical state machine to provide credential management and access management in conjunction with instruction execution according to an execution plan,
the executable hierarchical state machine to generate a security context for the execution plan to implement a guard condition governing a transition from a first state to a second state in accordance with the execution plan.

14. The computer-readable medium of claim 13, wherein the first state includes an input state and the second state includes an output state.

15. The computer-readable medium of claim 14, wherein the execution plan includes a behavior receiving an input from the first state to generate an output at the second state.

16. The computer-readable medium of claim 15, wherein the behavior is a first behavior and the input is a first input, and wherein the output forms a second input to a second behavior.

17. The computer-readable medium of claim 13, wherein the security context provides key management and access control policy enforcement.

18. The computer-readable medium of claim 13, wherein the guard condition is to be expressed as a state dependency tuple describing one or more previous states upon which a current state depends.

19. The computer-readable medium of claim 13, wherein a failure of the guard condition is to trigger a rollback to a secure state.

20. The computer-readable medium of claim 13, wherein the execution plan is to be implemented according to a publish-subscribe model, and wherein publishers and subscribers receive information regarding at least one of input to and output from according to a subscription.

21. The computer-readable medium of claim 20, wherein the subscription includes at least one of an input flow, a parameter flow, or an output flow.

22. A method to integrate a security service with an instruction execution flow in a distributed device environment, the method comprising:
generating, by executing an instruction with a processor, a security context to implement a guard condition; and
providing, by executing an instruction with the processor, the security context to a hierarchical state machine to implement the guard condition to govern a transition from a first state to a second state in accordance with an execution plan,
wherein the processor provides an executable hierarchical state machine including credential management and access management in conjunction with instruction execution according to an execution plan.

23. The method of claim 22, further including executing, as part of the execution plan a behavior based on an input received at the first state to generate an output at the second state.

24. The method of claim 22, wherein the execution plan is to be implemented according to a publish-subscribe model, and wherein publishers and subscribers receive information regarding at least one of input to and output from according to a subscription.

25. The method of claim 24, wherein the subscription includes at least one of an input flow, a parameter flow, or an output flow.

26. The method of claim 22, further including triggering a rollback to a secure state upon a failure of the guard condition.

27. An apparatus comprising;
- a means for generating a security context to implement a guard condition; and
- a means for providing the security context to a hierarchical state machine to implement the guard condition to govern a transition from a first state to a second state in accordance with an execution plan.

\* \* \* \* \*